United States Patent [19]
Chennakeshu et al.

[11] Patent Number: 5,822,310
[45] Date of Patent: Oct. 13, 1998

[54] HIGH POWER SHORT MESSAGE SERVICE USING BROADCAST CONTROL CHANNEL

[75] Inventors: Sandeep Chennakeshu; Nils Rydbeck; Amer A. Hassan, all of Cary, N.C.; Paul W. Dent, Stahag, Sweden

[73] Assignee: Ericsson Inc., Research Triangle Park, N.C.

[21] Appl. No.: 579,015

[22] Filed: Dec. 27, 1995

[51] Int. Cl.⁶ .................................................. H04B 7/204
[52] U.S. Cl. ........................... 370/317; 370/318; 455/10; 455/13.4
[58] Field of Search .................................. 370/317, 318; 455/10, 13.4

[56] References Cited

U.S. PATENT DOCUMENTS

| | | | |
|---|---|---|---|
| 4,301,533 | 11/1981 | Acampora et al. | 455/10 |
| 4,309,764 | 1/1982 | Acampora | 455/12 |
| 4,905,235 | 2/1990 | Saburi | 455/10 |
| 5,487,185 | 1/1996 | Halonen | 455/127 |
| 5,563,606 | 10/1996 | Wang | 455/13.3 |

FOREIGN PATENT DOCUMENTS

| | | |
|---|---|---|
| 0 086 541 | 8/1983 | European Pat. Off. . |
| 0 212 667 | 3/1987 | European Pat. Off. . |
| 0 632 605 | 1/1995 | European Pat. Off. . |
| 0 641 100 | 3/1995 | European Pat. Off. . |
| WO81/00034 | 1/1981 | WIPO . |
| WO94/01943 | 1/1994 | WIPO . |
| WO95/12936 | 5/1995 | WIPO . |
| WO96/04718 | 2/1996 | WIPO . |

OTHER PUBLICATIONS

E. Del Re et al., "The GSM Procedures in an Integrated Cellular/Satellite System", IEEE Journal on Selected Areas In Communication, vol. 13, Issue 2, pp. 421–430, Feb. 1995.
M. Luglio, "Fade Countermeasures in Ka Band: Application of Frequency Diversity to a Satellite System", Tenth International Conference on Digital Satellite Communications (Conf. Publ. No. 403), pp. 143–151, vol. 1, May 1995.
Siegmund M. Redl et al., "An Introduction To GSM," Artech House, Inc., pp. 86–99, 1995.

*Primary Examiner*—Melvin Marcelo
*Attorney, Agent, or Firm*—Burns, Doane, Swecker & Mathis, L.L.P.

[57] ABSTRACT

A method and system for increasing the signal margin of a radiocommunication link to provide a short message service which is reliable, even under non-ideal conditions. According to the method, short alphanumeric messages can be transmitted over the broadcast control channel of a digital radiocommunication link, or another communication channel consisting of one or more slots from successive frames in a TDMA communication link. An increase in transmission power is used in combination with repetition to increase effective signal margin without complications in the mobile unit design, significant delay, or co-channel interference. Where a more significant increase in signal margin is desired, when a longer message is required, or for voice messages, the message may be stored and the mobile unit alerted of the message.

20 Claims, 4 Drawing Sheets

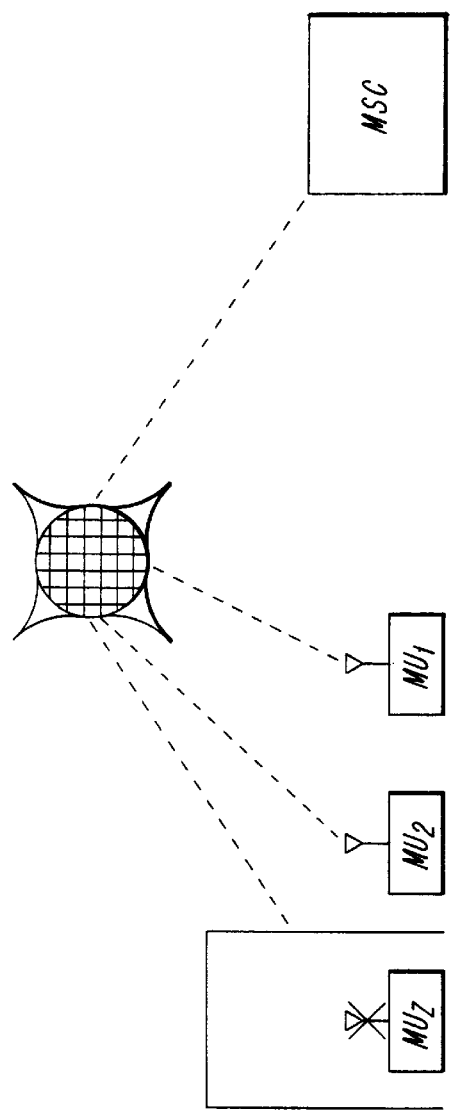
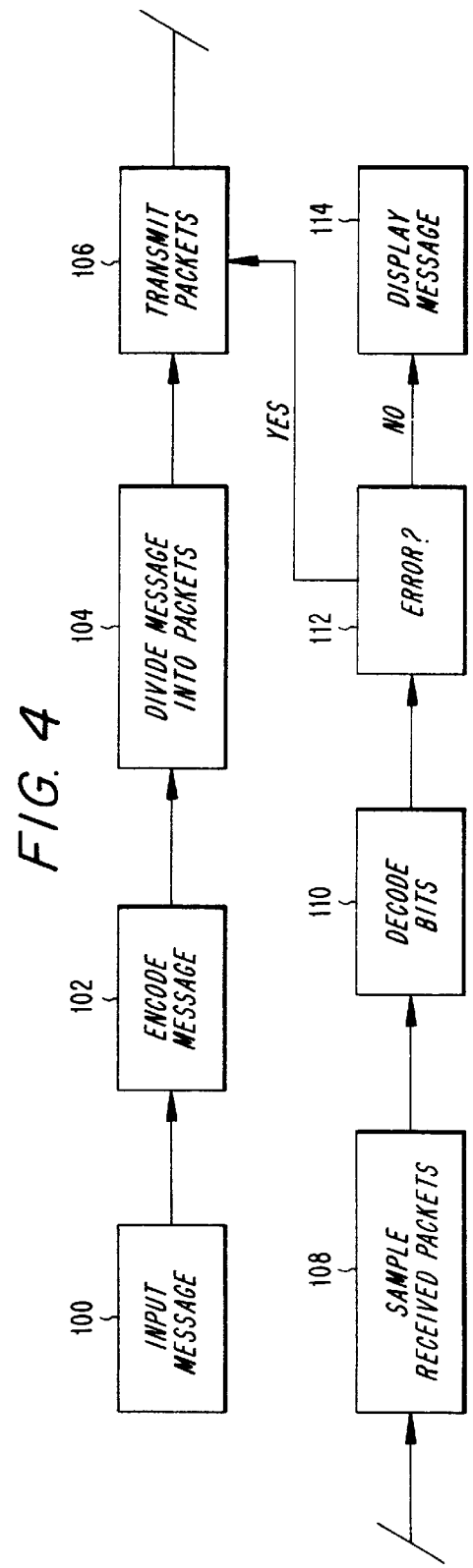

FIG. 5

| GUARD/RAMP | TAIL | DATA CODE | BEAM ID | DATA CODE | TAIL | GUARD/RAMP |
|---|---|---|---|---|---|---|
| 8.25 BITS | 3 BITS | 64 BITS | 14 BITS | 64 BITS | 3 BITS | 8.25 BITS |

FIG. 6

| FCH | SCH | DATA/PAGE | DATA/PAGE | DATA/PAGE | DATA/PAGE | DATA/PAGE | DATA/PAGE | DATA/PAGE | DATA/PAGE | DATA/PAGE | DATA/PAGE | DATA/PAGE |
|---|---|---|---|---|---|---|---|---|---|---|---|---|
| 1 | 2 | 3 | 4 | 5 | 6 | 7 | 8 | 9 | 10 | 11 | 12 | 13 |

HIGH POWER SHORT MESSAGE SERVICE USING BROADCAST CONTROL CHANNEL

CROSS-REFERENCE TO RELATED APPLICATIONS

The present application is related to the following copending, commonly-assigned U.S. patent applications: Ser. No. 08/559,692, filed Nov. 15, 1995; Ser. No. 08/588,507, filed Jan. 18, 1996; and Ser. No. 08/578,945, filed Dec. 27, 1995.

BACKGROUND OF THE INVENTION

The present invention generally relates to radiocommunication systems and more particularly relates to a system and method for reliably transmitting alphanumeric messages via radiocommunication signals under non-ideal conditions.

Referring to FIG. 1, a typical cellular mobile radiocommunication system is shown. The typical system includes a number of base stations similar to base station 110 and a number of mobile units or stations similar to mobile 120. Voice and/or data communication can be performed using these devices or their equivalents. The base station includes a control and processing unit 130 which is connected to the MSC (mobile switching center) 140 which in turn is connected to the public switched telephone network (not shown).

The base station 110 serves a cell and includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station or cell to mobiles locked to that control channel. The voice channel transceiver broadcasts the traffic or voice channels which can include digital control channel location information.

When the mobile 120 first enters an idle mode, it periodically scans the control channels of base stations like base station 110 for the presence of a paging burst addressed to the mobile 120. The paging burst informs mobile 120 which cell to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the cell with which it is associated, but also contains relative information concerning other cells proximate to the cell with which the control channel is associated. These adjacent cells are periodically scanned while monitoring the primary control channel to determine if there is a more suitable candidate. Additional information relating to specifics of mobile and base station implementations can be found in U.S. patent application Ser. No. 07/967,027 now U.S. Pat. No. 5,745,523, entitled "Multi-Mode Signal Processing" filed on Oct. 27, 1992 to P. Dent and B. Ekelund, the entirety of which is incorporated herein by reference. It will be appreciated that the base station may be replaced by one or more satellites in a satellite-based mobile radiocommunication system.

To increase radiocommunication system capacity, digital communication and multiple access techniques such as Frequency Division Multiple Access (FDMA), Time Division Multiple Access (TDMA), and Code Division Multiple Access (CDMA) may be used. The objective of each of these multiple access techniques is to combine signals from different sources onto a common transmission medium in such a way that, at their destinations, the different channels can be separated without mutual interference. In a FDMA system, users share the radio spectrum in the frequency domain. Each user is allocated a part of the frequency band which is used throughout a conversation. In a TDMA system, users share the radio spectrum in the time domain. Each radio channel or carrier frequency is divided into a series of time slots, and individual users are allocated a time slot during which the user has access to the entire frequency band allocated for the system (wideband TDMA) or only a part of the band (narrowband TDMA). Each time slot contains a "burst" of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user. In a CDMA system, each user is assigned a unique pseudorandom user code to uniquely access the frequency time domain. Examples of CDMA techniques include spread spectrum and frequency hopping.

In a TDMA system, the successive time slots assigned to the same user, which are usually not consecutive time slots on the radio carrier, constitute the user's digital traffic channel, which is considered to be a logical channel assigned to the user. The organization of TDMA channels, using the GSM standard as an example, is shown in FIG. 2. The TDMA channels include traffic channels TCH and signaling channels SC. The TCH channels include full-rate and half-rate channels for transmitting voice and/or data signals. The signaling channels SC transfer signaling information between the mobile unit and the satellite (or base station). The signaling channels SC include three types of control channels: broadcast control channels (BCCHs), common control channels (CCCHs) shared between multiple subscribers, and dedicated control channels (DCCHs) assigned to a single subscriber. A BCCH typically includes a frequency correction channel (FCH) and a synchronization channel (SCH), both of which are downlink channels. The common control channels (CCCHs) include downlink paging (PCH) and access grant (AGCH) channels, as well as the uplink random access channel (RACH). The dedicated control channels DCCH include a fast associated control channel (FACCH), a slow associated control channel (SACCH), and a standalone dedicated control channel (SDCCH). The slow associated control channel is assigned to a traffic (voice or data) channel or to a standalone dedicated control channel (SDCCH). The SACCH channel provides power and frame adjustment and control information to the mobile unit.

The frequency correction channel FCH of the broadcast control channel carries information which allows the mobile unit to accurately tune to the base station. The synchronization channel SCH of the broadcast control channel provides frame synchronization data to the mobile unit.

The random access channel RACH is used by the mobiles to request access to the system. The RACH logical channel is a unidirectional uplink channel (from the mobile to the base station or satellite), and is shared by separate mobile units (one RACH per cell is sufficient in typical systems, even during periods of heavy use). Mobile units continuously monitor the status of the RACH channel to determine if the channel is busy or idle. If the RACH channel is idle, a mobile unit desiring access sends its mobile identification number, along with the desired telephone number, on the RACH to the base station or satellite. The MSC receives this information from the base station or satellite and assigns an idle voice channel to the mobile station, and transmits the channel identification to the mobile through the base station or satellite so that the mobile station can tune itself to the new channel. All time slots on the RACH uplink channel are used for mobile access requests, either on a contention basis or on a reserved basis. Reserved-basis access is described in U.S. patent application Ser. No. 08/140,467, now U.S. Pat. No. 5,420,864 entitled "Method of Effecting Random Access in a Mobile Radio System", which was filed on Oct. 25, 1993, and which is incorporated in this application by reference. One important feature of RACH operation is that reception of some downlink information is required, whereby mobile stations receive real-time feedback for every burst they send on the uplink. This is known as Layer 2 ARQ, or automatic repeat request, on the RACH. The downlink information preferably comprises twenty-two bits that may be thought of as another downlink sub-channel dedicated to carrying, in the downlink, Layer 2 information specific to the uplink. This flow of information, which can be called shared channel feedback, enhances the throughput capacity of the RACH so that a mobile station can quickly determine whether any burst of any access attempt has been successfully received. As shown in FIG. 2, this downlink information is transmitted on channel AGCH.

Transmission of signals in a TDMA system occurs in a buffer-and-burst, or discontinuous-transmission, mode: each mobile unit transmits or receives only during its assigned time slots in the TDMA frames on the mobile unit's assigned frequency. At full rate, for example, a mobile station might transmit during slot 1, receive during slot 2, idle during slot 3, transmit during slot 4, receive during slot 5, and idle during slot 6, and then repeat the cycle during succeeding TDMA frames. The mobile unit, which may be battery-powered, can be switched off (or "sleep") to save power during the time slots when it is neither transmitting nor receiving.

To increase mobility and portability, radiocommunication subscribers tend to prefer mobile units having a relatively small, omnidirectional (and accordingly, less powerful) antenna over mobile units having a large or directional antenna. Because of this preference, it is sometimes difficult to provide sufficient signal strength for the exchange of communication signals between typical mobile units having a small, omnidirectional antenna and a mobile switching center (MSC) or satellite. This problem is particularly serious in satellite-based mobile radiocommunications.

A satellite-based mobile radiocommunication system provides radiocommunication services to particular geographical areas of the earth using one or more partially overlapping satellite beams. Each satellite beam has a radius of up to about 1000 KM. Due to the power limitations of a satellite, it is not practical to provide a high link margin in every beam simultaneously.

Because mobile satellite links are severely power limited, communication is typically limited to line-of-sight channels with Ricean fading. Ricean fading occurs from a combination of a strong line-of-sight path and a ground-reflected wave, along with weak building-reflected waves. These channels require a communications link margin of approximately 10 dB or more to achieve voice communication in ideal or near-ideal conditions, such as when the mobile radiotelephone unit antenna is properly deployed and the unit is in an unobstructed location. In these near-ideal channels, the mobile unit can successfully monitor the paging channel to detect incoming calls. In non-ideal conditions, such as when the mobile unit antenna is not deployed or the mobile unit is in an obstructed location (e.g., inside a building) reflected waves, including ground-reflected and building-reflected waves, become dominant. The channels in these non-ideal conditions are characterized by flat Rayleigh fading (the most severe type of fading) with severe attenuation. In such channels, a link margin of as much as 30 dB or more is required to achieve reliable voice or data communication, and the mobile unit in this case cannot monitor the paging channel to detect incoming calls. In these non-ideal conditions, a short message service (SMS) is desirable. Due to the power limitations of the satellite, SMS is particularly effective when used in non-ideal conditions to alert a mobile station user of an incoming call. The mobile user may then change locations to receive or return the call. The term "link margin" or "signal margin" refers to the additional power required to offer adequate service over and above the power required under ideal conditions—that is, a channel having no impairments other than additive white Gaussian noise (AWGN). "Impairments" include fading of signal amplitude, doppler shifts, phase variations, signal shadowing or blockage, implementation losses, and anomalies in the antenna radiation pattern.

Whether transmitting voice or data, it is frequently desirable to increase the signal margin to ensure reliable radio-communication performance, particularly in power-limited satellite applications. Known methods of increasing the link margin of a signal include expanding the channel bandwidth to achieve frequency selectivity or to use forward error correction coding (such as convolutional coding), increasing signal power, and bit repetition (which can be viewed as a form of forward error correction coding). Each of these methods has significant limitations. Bandwidth expansion is typically achieved by known methods such as signal spreading and low bit rate error correction coding, and results in a signal which is less sensitive to fading. Bandwidth expansion reduces spectrum allocation efficiency. Further, in a SMS application, if the expanded bandwidth of the voice channel is different from (larger) the bandwidth of the message channel, two separate and complete radios (one for each service) will be required in the mobile unit, thereby complicating its design. Also, a coherent Rake receiver or equalizer is also typically required to reduce delay spread, further complicating the design of the mobile unit. Bandwidth expansion may also be implemented by repeated transmissions of the entire voice or data message. However, under the non-ideal conditions of interest, this method is not effective because each repetition is typically below the noise floor (that is, does not have a sufficient margin), resulting in a high error rate and preventing the coherent integration of the repetitions.

Increasing signal power may also be used to provide a higher margin. Due to the power limitations of the satellite, this is typically not a practical approach. In addition to increasing the cost of the system, increased transmission power also makes it more difficult to control co-channel interference, particularly in TDMA systems with narrow reuse margins. Accordingly, large power increases from the satellite to the mobile unit may be provided only during periods of relatively light use. Further, because the mobile unit is even more power limited than the satellite, this technique is typically practical only in one direction, from the satellite to the mobile unit.

Bit repetition may also be used to increase the margin. Bit repetition results in lower error rate than message repetition, particularly in non-ideal conditions. Bit repetition causes transmission delay, which is not desirable for voice signals, for obvious reasons. However, transmission delay may be acceptable for data communications, such as a SMS feature, provided that the delay is kept to a reasonable minimum. Bit repetition is achieved by transmitting individual bits or modulation symbols, or packets of bits or modulation symbols, a plurality of times such that all repetitions are contiguous or contained within the same time slot or slots of successive TDMA frames. The receiver integrates the energy from each repetition to create a signal having a higher margin. As noted above, bit repetition can cause significant delay, depending upon the length of the message. To achieve a 30 dB signal margin, each bit will have to be repeated 1000 times. A typical short message has between 32 and 64 characters in the GSM system, the European digital standard, up to 245 characters in the DAMPS (Digital Advanced Mobile Phone Service IC-136) system currently used in the United States, and up to 160 characters in the DECT (Digital European Cordless Telephone) system. Assuming a GSM system having TDMA frames of 18.64 ms, with 16 slots per frame and 114 data bits/slot, the minimum delay for receiving a 64 character message, not including propagation time, is as follows:

64 bits×8 bits/character×1000 repetitions/bit×18.64 ms/slot×1/114 slot/data bit=84 seconds.

Such a delay is highly undesirable, even for data transmission. Accordingly, it would be desirable for a radiocommunication system to allow for transmission of signals at an increased signal margin without significant delay and without a significant increase in power.

It would be further desirable for a communication system to allow for transmission of signals with an increased signal margin without requiring expansion of the channel bandwidth.

It would also be desirable for a TDMA communication system to allow for transmission of signals with an increased signal margin without requiring a change in the structure or organization of TDMA frames.

It would be further desirable for a mobile radiocommunication system to allow for transmission of data messages originating from either a mobile unit or from a satellite or base station with an increased signal margin.

It would be further desirable for a communication system to selectively increase the signal margin of a communication link for the transmission of data messages.

SUMMARY OF THE INVENTION

The above-noted and other limitations of conventional communication systems and methods are overcome by the present invention, which provides for a high-penetration transmission method for transmitting short alphanumeric messages in which signal margin is increased by a combination of bit or message repetition and a relatively small increase in power. According to exemplary embodiments, the combination of bit or message repetition and a relatively small increase in power avoids the unacceptable delays characteristic of systems which rely solely on repetition to increase the signal margin. Likewise, the combination of repetition and a relatively small increase in power avoids the co-channel interference problems of systems which rely solely on increased power to increase the signal margin.

According to an exemplary embodiment of the present invention, a mobile radiocommunication system is provided with a short message service feature for transmitting alphanumeric messages to and from a mobile unit. In order to ensure reliable transmission over channels having severe attenuation, the short message is encoded with error detection coding to form one or more data codewords; each codeword is transmitted multiple times over a message channel having message frames. Each message frame is made up of time slots from each TDMA frame or each set of TDMA frames. The message channel is transmitted at a power level greater than the power level for voice transmission and greater than the power level for control information transmission. The message channel may be formed by slots taken from the broadcast control channel or other suitable channel. The multiple transmissions are integrated and checked for errors at the receiver.

BRIEF DESCRIPTION OF THE DRAWINGS

The foregoing objects, features and advantages of the present invention will be more readily understood upon reading the following detailed description in conjunction with the drawings in which:

FIG. 3 is a diagram of a satellite-based mobile radiocommunication system in which the signal transmission method of the present invention may be implemented;

FIG. 4 is a flow chart describing the transmission of a short message according to an embodiment of the present invention;

FIG. 5 is a diagram showing a burst format of an SMS slot according to an embodiment of the present invention; and FIG. 6 is a diagram showing a frame format of an SMS service according to an embodiment of the present invention.

DETAILED DESCRIPTION OF THE PREFERRED EMBODIMENTS

Figure 1:
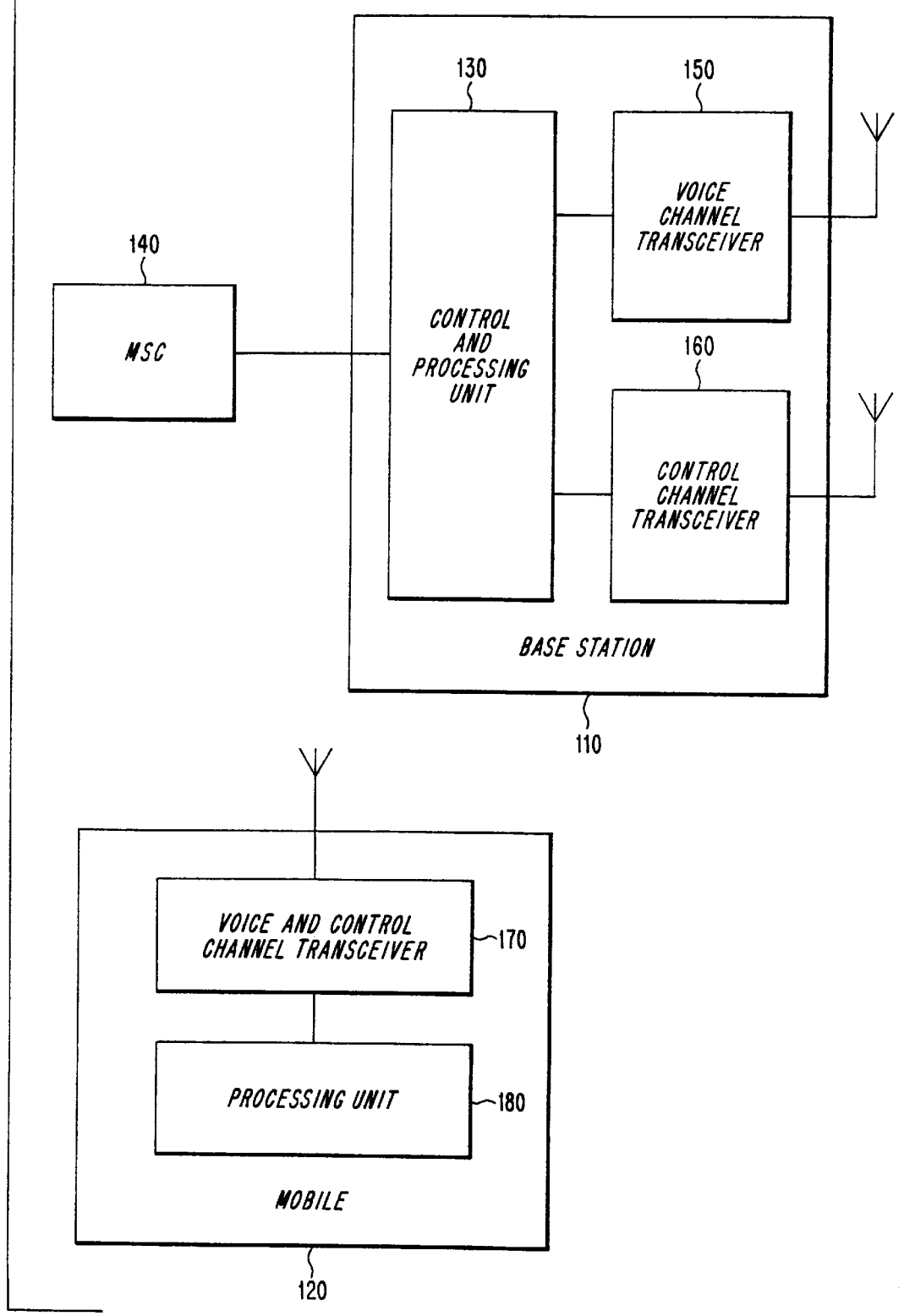
FIG. 1 is a block diagram of an exemplary mobile radiocommunication system.
Figure 2:
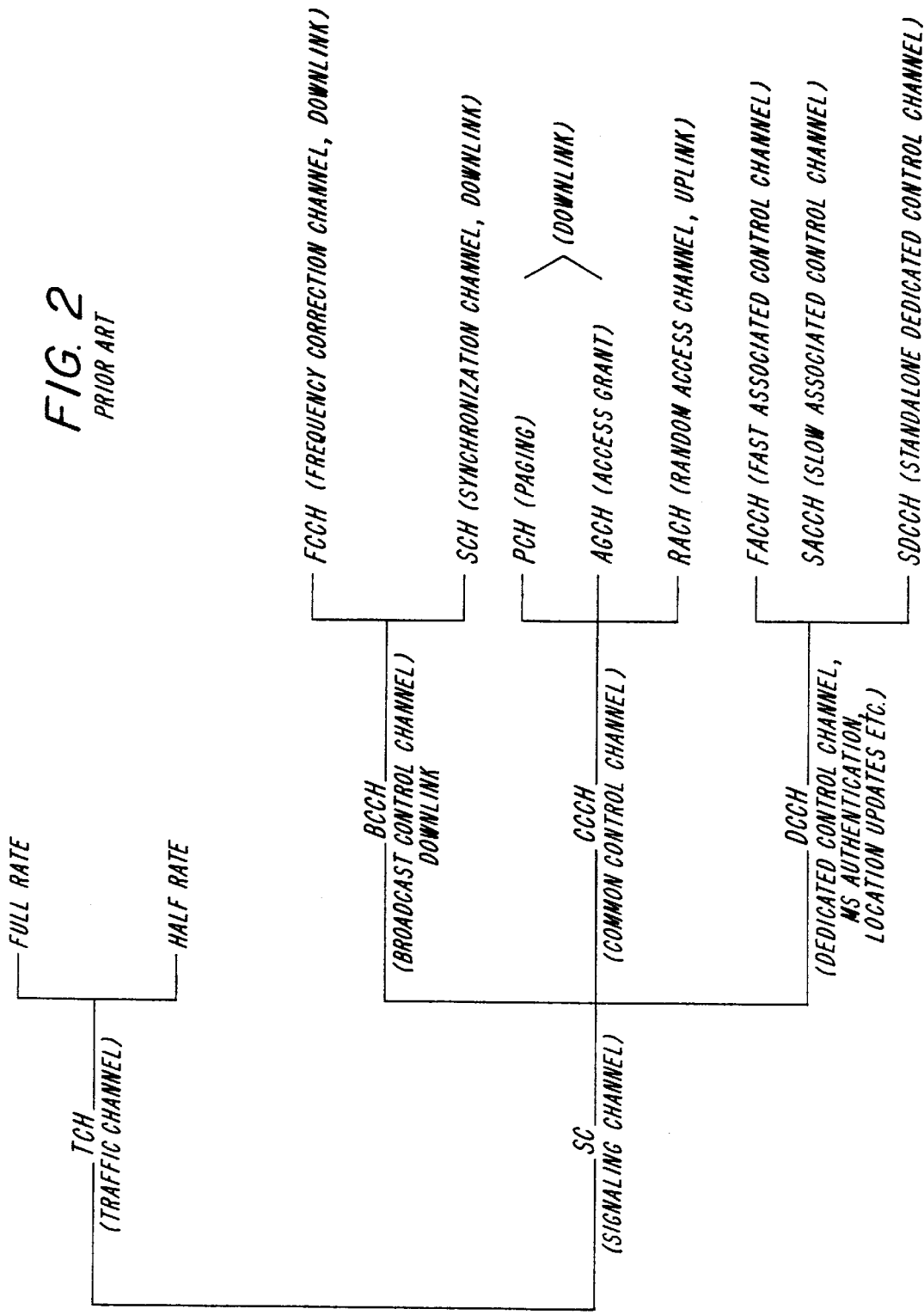
FIG. 2 is a diagram showing the organization of channels in a typical GSM digital radiocommunication system.

While the following description is directed toward a short message service implemented in a satellite-based radiocommunication system, it will be appreciated that the present invention may also be applied to other types of communication systems.

In a satellite-based mobile radiocommunication system, a communication link for transmitting voice or data may be established over a satellite beam between a mobile station and either a standard telephone or a second mobile station through one satellite, multiple satellites, or a combination of one or more satellites and the PSTN (public switched telephone network). Such a system, as shown in FIG. 3, may be desirable to achieve a broad geographical coverage in which few or no base stations are present, and additional base stations are not practical, such as in rural areas. Due to the inherent power limitations of satellites, voice communications links between the satellite and the mobile station require ideal or near-ideal conditions; that is, conditions such as line-of-sight communication with the mobile station's antenna properly deployed. In non-ideal conditions, such as when the mobile station is shadowed (e.g., inside a building, etc.) or when the mobile antenna is not properly deployed, the power or signal margin requirements for communication increases significantly due to the increased attenuation in the channel. In such situations (shown as MUz in FIG. 3), Rayleigh fading often prevents satisfactory communication, and it is therefore desirable to send a short alphanumeric message to the mobile station. The message may be used, for example, to inform the subscriber of an incoming call. The present invention ensures reliable transmission of the message by providing for an efficient technique for increasing signal margin without significant delay, power increase, or co-channel interference.

For purposes of illustration only, and without limiting the scope of the invention, a satellite-based GSM radiocommunication system using TDMA channels may be assumed to exhibit the following conditions. The communication channel has no line of sight component and is subject to flat Rayleigh fading with severe attenuation. As will be appreciated by those of skill in the art, Rayleigh (or multipath) fading is a phenomenon which occurs when multipath waves form standing-wave pairs due to reflection from the physical structures in a service area. The standing-wave pairs summed together form an irregular wave fading structure. When the mobile unit is stationary, it receives a constant signal. However, when the mobile unit is moving, the fading structure causes fading to occur which increases as the mobile unit moves faster. The mean signal level of the non-ideal Rayleigh channel is approximately 20–30 dB below the signal level of a near-ideal line-of-sight channel.

In order to ensure reliable transmission of a short message to the mobile unit in non-ideal conditions, the signal margin must be increased. According to the present invention, bit or message repetition and power increase can be combined to provide an increased signal margin without significant delay.

It will be appreciated that decibels (dB) are units used to express ratios of power, current, or voltage. Specifically, a power ratio (P2/P1) may be expressed in decibels by the formula dB=10 log (P2/P1). A signal margin of 30 dB requires a power ratio of 1000, since 10 log 1000=30. Thus, to achieve this signal margin solely by bit repetition, each bit must be repeated 1000 times and the signal margin from each repetition must be integrated at the receiver, resulting in the 82 second delay calculated above. However, to achieve a 15 dB margin, the required power ratio is only 31.623, since 10 log 31.623=15. Thus, a 30 dB signal margin may be provided by increasing the power by 15 dB and repeating each bit approximately 31 times. Using this technique, the bit-repetition delay for a 64 character message is (64 characters×8 bits/character×31 repeats/bit×18.64 ms/slot×1/114 slot/bits) approximately 2.5 seconds. As a result, the bit repetition delay is maintained at a reasonable level, and the power increase is also maintained at a reasonable level, thereby avoiding co-channel interference. It will be appreciated that many different combinations of repetitions and power increases are possible to achieve successful communication in Rayleigh fading environments without significant delay. Further, rather than repeating individual bits of a digital signal, groups of bits may be repeated.

To implement the technique of the present invention, the power increase from the satellite to the mobile station may be provided by averaging a power load across multiple users. That is, communication channels used by mobile units in near-ideal conditions might have their power reduced to increase the power supply to a mobile unit or units in the non-ideal conditions. Power increase may also be provided by time averaging, in which individual slots in consecutive TDMA frames are transmitted at an increased power level. It will be appreciated that the power increase from the satellite to the mobile station may also be achieved by other techniques known in the art.

The power limitations of the mobile unit are even more severe than the power limitations of the satellite. Thus, it is even more difficult to increase power for communication from the mobile to the satellite. Such communication may be necessary to send a message or acknowledge receipt of a message. According to one embodiment of the present invention, the power increase from the mobile unit to the satellite may be achieved by allowing the mobile unit to transmit on all time slots of the random access channel RACH. Bit or message repetition may also be implemented by the mobile unit to further effectively increase the margin of the signal transmitted to the satellite. Since acknowledgment by the mobile unit over the RACH channel may be accomplished by a signal having a low information rate, a higher number of sync bits and a higher number of bit and message repetitions relative to the forward channel can be used to compensate for the lower transmission power of the mobile unit. Preferably, the mobile unit transmits consecutive repetitions on separate carrier frequencies to decorrelate the repetitions. Because the message is short, the transmission time will be short and the average transmitted power will be acceptable using this system.

Referring now to FIG. 4, a flow chart describing the transmission of a short message using the transmission method of the present invention is shown. In step 100, a sending party inputs a message to be transmitted to a receiving subscriber. The message may be input into the communication system directly by the sending party through a mobile unit, a standard telephone, a computer terminal, or equivalent device, or the message may be input indirectly by calling an operator at a service center who inputs the message into the system. In step 102, the information bits comprising the short message are encoded by an encoder located at the transmitter with an error detection code, such as CRC. The encoded message constitutes one or more codewords, each containing codeword bits or symbols. It should be recognized that the transmitter may be the satellite, a base station, or a mobile unit. In step 104, bit repetition can be employed, such that each of the codeword bits or symbols output by the encoding means are repeated N times to form a packet containing N bits. It will be apparent that, instead of repeating individual bits or symbols, groups of two or more bits or symbols, or the entire codeword or codewords could also be repeated. Packets are then transmitted such that each slot within a TDMA frame includes one or more packets of repeated bits, error detection coding bits, and a sync burst to enable the receiver to estimate the channel quality. All bits comprising the encoded short message are transmitted in this fashion. If bit repetition and message repetition are employed, once the entire encoded message has been transmitted, the transmission of the message (in the form of packets of N codeword bits) can be repeated M times to achieve the desired signal margin. It will be appreciated that, since the short message may be transmitted from a satellite, base station, or mobile station, encoding and transmitting functions are provided in each of these devices. It will also be appreciated that, in order to implement the technique of the present invention, means are included in the transmitter to determine the number of bit repetitions N, message repetitions M, and power increase necessary to achieve the signal margin required for successful transmission of the message.

In step 108, the receiving device (i.e., the mobile unit, satellite, base station, or equivalent device) samples the received signal, including the repeated encoded message bits, error detection bits, and channel quality estimation bits, and generates a metric sum of the form $$\gamma_j = \sum_{i=1}^{N} |r_{ij}, \hat{C}_j s|^2,$$

where $r_{ij}$ is the sampled received signal corresponding to the ith repetition of the information bit or symbol S in packet repeat j, and $C_j$ is the corresponding estimate of channel quality. In step 110, a decoder contained in the receiving device decodes each encoded bit or symbol in the TDMA slot from the metric sums, using soft combining or majority logic voting, or other suitable decoding methods. To implement soft combining, the decoder adds metric sums as $$\gamma = \sum_{J=1}^{M} \gamma_j$$

and makes a bit or symbol decision based on the sum. To implement majority logic voting, the decoder makes a preliminary bit or symbol decision for each metric $y_j$ and then a makes a final bit or symbol decision by comparing all of the preliminary decisions. Thus, if the decoder has made M preliminary decisions, the decoder will determine that the corresponding information bit is a 1 if more than half of the preliminary decisions were 1; otherwise, the decoder will determine that the corresponding information bit is a 0. The same logic is used to decode a bit that is a 0. To prevent an error which might result if exactly half of the preliminary decisions are 0 and exactly half of the preliminary decisions are 1, M is chosen to be an odd number. The decoded bits are combined coherently and the multiple transmissions of the message are combined coherently to generate a message signal having an increased margin.

In step 112, an error detector contained in the receiving apparatus detects errors based on the CRC error detection coding provided at the transmitting apparatus. If no errors are detected, the message is displayed on the receiving subscriber's mobile unit in step 114. If an error is detected, then the message is not displayed at the receiving apparatus, the user is notified of an erroneous message by a displayed error message or by an audio signal, and the receiver requests the transmitter to retransmit message or the erroneous parts of the message in accordance with a bidirectional radio protocol described in more detail below.

According to the present invention, repeated transmission of messages may be used in combination with repetition of individual portions of a message. That is, individual portions of the message may be transmitted multiple times, and when the entire message has been transmitted by means of the repeated transmissions of the message portions, the entire message may be transmitted again.

According to an exemplary embodiment of the present invention, a high-penetration short message service can be implemented in a satellite-based telecommunications system using the above-described transmission method as follows. On the carrier frequency that contains the broadcast control channel BCCH, the first slot of each (e.g., 16-slot) frame is allocated for the broadcast control channel. The broadcast control channel is implemented over 51 frames. The 51-frame repeating pattern contains frequency and synchronization correction channels FCH and SCH, as well as broadcast and paging channels PCH. The carrier on which the satellite-mode BCCH is transmitted is not necessarily active in all timeslots. In particular, if no conversation is currently set up on the carrier of a given beam, only the BCCH slot of the carrier may contain energy; that is, the traffic and other slots on the carrier will not contain energy.

Each BCCH slot is preferably transmitted at a higher power level than the mean power level of the traffic slots on the carrier. Preferably, the frequency correction channel FCH and the synchronization channel SCH of the BCCH are used for the short message service. In this embodiment, 4 slots in the 51-slot BCCH frame are dedicated to the short message service. These SMS slots occur in frames 1, 13, 26 and 40. Thus, over the 51-slot BCCH frame, the SMS slots are spaced 12, 13, 14, 12, 12, 13, 14, . . . slots apart, allowing the receiver to determine the frame timing solely by signal strength profile. The 4 SMS slots are transmitted at a higher power level than the remaining 47 BCCH slots, which are transmitted at a higher power level than the remaining TDMA channel slots on the carrier containing the BCCH channel. It will be appreciated that this implementation of the broadcast control channel BCCH is unlike the standard GSM implementation in that the frequency correction channel FCH is not an unmodulated burst.

Referring now to FIG. 5, the format of a burst transmitted on an SMS slot according to an exemplary embodiment of the present invention is shown. The burst includes beam identification bits BEAM ID which identifies the satellite and the beam being used. If 14 bits are used for the BEAM ID, 16,384 unique identifiers are possible. This allows identification of, for example, up to 512 beams on each of 32 satellites may be identified. It will be appreciated that the identifiers may be reused on separate frequencies. The receiver can continuously average corresponding bits in each of multiple SMS bursts to effectively increase the signal margin of the BEAM ID information, allowing the BEAM ID to be determined even in non-ideal environments.

The SMS burst further includes two 64-bit datacodes DATACODE which form a 128-bit datacode. The 128-bit datacode can have one of between 1 and 128 mutually orthogonal values. These orthogonal values are bit patterns resembling synchronization words, and therefore provide the functions of frequency correction and synchronization to effectively replace the omitted channels FCH and SCH. According to an exemplary embodiment, if 128 mutually orthogonal values are assumed, 7 bits of information are provided in each burst. In this embodiment, each message is repeated twice. Alternatively, a lower number of mutually orthogonal values may be assumed and the number of message transmissions can be reduced, maintaining the same overall data throughput. Error correction coding may also be used, as will be described in more detail below.

A typical SMS message contains, for example, 112 bits. The 112 bits includes information bits and CRC error detection code bits. To transmit a 112-bit message twice, 224 message bits must be transmitted. As shown in FIG. 5, each SMS burst includes 156.25 bits which include 8.25 bits GUARD/RAMP for guard and ramp up/down functions, 6 tail bits TAIL, and 142 information bits. The 142 information bits include 14 BEAM ID bits and 128 datacode bits. Because the 128 datacode bits correspond to 7 information bits, 7 message bits are transmitted in each SMS burst. To deliver 224 message bits, 32 SMS bursts are required. Since there are 4 SMS bursts for each 51-slot BCCH frame, 408 BCCH frames are required for each message. Based on a frame length of 9.23 mS, the 112-bit message is delivered in approximately 3.77 seconds. It will be appreciated that if the satellite system includes 121 beams, the satellite can deliver (121/3.77) approximately 32 messages per second.

The power required to implement an SMS system according to the above exemplary embodiments can be determined as follows. The BCCH channel as implemented above results in one BCCH burst every TDMA frame; thus, a BCCH burst occurs once every 16th slot. The particular slot in which a given BCCH burst may occur is preferably staggered from satellite beam to satellite beam in a 16-cell pattern. Assuming the satellite has 121 beams, approximately 8 beams capable of transmitting SMS information are active at a given time, while the other 113 beams are transmitting traffic information. As previously described, the SMS slots are spaced apart in slots 1, 13, 26, and 40 of a BCCH frame. This spacing allow for 12 orthogonal staggered SMS frames in different beams. Thus, the 8 beams simultaneously transmitting beams capable of carrying SMS information do not transmit SMS information at the same time. An SMS slot is transmitted in only one beam at a time, thereby maintaining a constant total phased array transmitter loading.

The link margin for the SMS signal is effectively increased by the combination of increased power, signal spreading from the 128-bit datacode, bit or message repetitions, and the gain due to the error correction coding. The link margin, excluding coding gain, for the above-described example can be determined as follows. The traffic channel provides a minimum 7 dB margin over an AWGN channel. The SMS channel is transmitted using 9 dB additional power over the traffic channel, for an increased margin of 16 dB over an AWGN channel. The spreading gain due to the 128 chip code for 7 information bits provides an additional 12.6 dB gain, for an increased margin of 28.6 dB. Finally, message repetitions used in conjunction with soft decision decoding provides an additional 3 dB gain, for a total SMS link margin of approximately 31.6 dB. Since error correction coding provides an additional gain, it will be appreciated that an SMS system according to the present invention provides a sufficient link margin to allow for communication even in non-ideal conditions, such as when the mobile unit is shadowed and/or the antenna is not properly deployed.

As described above, the SMS system of the present invention allows synchronization to be achieved even though the SCH channel is used for SMS transmission. According to the present invention, synchronization can be achieved as follows. The receiver locates the higher power SMS bursts using a power profile method based on average received signal strength. The receiver synchronizes itself with the incoming signal to the bit level by correlation with the orthogonal datacodes in each SMS burst. The correlations are added over the message repeats to provide an adequate signal-to-noise ratio to reliably decode message data. Once synchronization is achieved, the mobile unit will sleep for 47 BCCH slots and wake up for the 4 SMS slots, resulting in a duty cycle of approximately 1/204. The mobile may also wake up an additional 4–8 slots over each 51-frame period, for example, to determine whether it can receive a normal calling channel. This additional receiver activity results in a duty cycle of approximately 1.5%.

It will be appreciated that the SMS system of the present invention may be implemented in other ways, and is not limited to the specific details of the exemplary embodiments described above. Thus, the SMS system of the present invention may be implemented using any particular slot or slots every N frames in a TDMA system. For example, a paging slot every fourth frame on a given carrier frequency in each satellite beam can be used to selectively provide SMS service. When SMS service is not needed or desired, these slots can be used for voice traffic. In this embodiment, the SMS slot is transmitted using 6 dB more power than the voice slots on the same carrier. Successive SMS slots form a 13-slot SMS frame as shown in FIG. 6. The SMS frame in this embodiment has a first slot used for frequency correction information and a second slot for synchronization information. Slots 3–13 are used for data or paging, and are of the format shown in FIG. 5. Each data slot carries information bits for one receiver only. Each bit and each message in this embodiment can be transmitted three times. For a typical message consisting of 120 data bits, the time to deliver one message is approximately 11.5 seconds. Assuming a satellite having 150 beams, 13 messages can be delivered each second.

According to a further aspect of the present invention, the message repetitions are decorrelated by, for example, transmitting the message or message portions on different frequencies, on different polarizations, or at appropriate time delays.

The transmission system of the present invention may further include forward error correction (FEC) means. In such an arrangement, the transmitter is provided with a second encoder for encoding the information bits of the short message with an error correction code, after encoding the information bits with an error detection code. The message is transmitted, and the received message decoded, in the manner previously described. With majority logic voting, a hard decision decoder is employed, and the bits at the output of the majority logic voter are fed to a channel decoder with no additional information (such as bit reliability information estimated from the channel). If soft combining is used, a soft decision decoder is employed to decode the error correction code, and metric sums $y_j$ are added to the soft decision decoder output, and the sum is fed to an error correction decoder. Error correction coding will be more effective if different outputs of the error correction encoder are interleaved by separating consecutive output bits as far as possible in the transmission stream.

It will be appreciated that the higher the number of bit and message repetitions, the better the performance of the system will be, but the longer the delay will be. A TDMA slot has a finite number of bits which may be used as either sync information or data. Increasing the number of bit repeats (N) in a packet necessarily requires a reduction in the number of sync bits. The metric sum depends upon the estimated channel quality, and the channel quality depends upon the number of sync bits. If a TDMA slot has $N_t$ bits, there are $N_s$ sync bits/slot, and $N_t-N_s$ data bits per slot, then the gain in signal-to-noise ratio per bit due to repetition is approximately $(N_tN_s-N_s2)/N_t$. The optimal gain in signal-to-noise ratio therefore occurs when $N_s=N_t/2$. However, it will be appreciated that the choice of the number of sync bits and data bits in a given slot will depend upon the particular transmission scheme to be implemented.

As described above, the link established for communicating messages between a satellite and a mobile station is a bidirectional link. Accordingly, a radio protocol may be chosen for use between the satellite and the mobile station to enhance the utility of the short message system. For example, a simple protocol may be implemented in which a mobile station receiving a message would respond to the satellite with a "YES" or "NO" to indicate whether the message was received correctly. Alternatively, a more complicated protocol can be implemented in which a packet or group of packets is identified by a group ID and protected by CRC error detection code. If the CRC indicates that the message was not received correctly, then the satellite can resend the packets comprising the erroneous group. In this manner, only packets with errors need to be retransmitted, as opposed to resending a complete message. Thus, this protocol can be used to optimize the number of repeats and thereby minimize delay and wasted satellite power.

The bidirectional link of the SMS according to the present invention also provides for advantages with respect to billing. A unidirectional link prevents a short message delivery fee to be charged to the sender or recipient because there is no evidence that the message was correctly received. Thus, a SMS service with a unidirectional link may be offered to a subscriber at an increased subscription rate. In contrast, because a bidirectional link allows a message sender or service operator to determine whether a message was correctly received, the service operator can provide a SMS service with a delivery fee for each correctly received message only.

As discussed above, for longer messages, voice communications, or conditions requiring a link margin of greater than 3040 dB, unacceptably long delays may result in the technique of the present invention. In such cases, the message may be stored at the satellite or corresponding cellular mobile switching center (MSC). When the mobile unit is able to read the broadcast control channel (BCCH) of a more favorable communication channel, the unit may be alerted of the stored message by means of, for example, a flag on the broadcast control channel.

While the foregoing description has included many specificities, the exemplary embodiments disclosed are for illustrative purposes only, and are not limiting of the present invention. Many modifications will be readily apparent to those of ordinary skill in the art which do not depart from the spirit and scope of the invention, as defined by the appended claims and their legal equivalents.

What is claimed is:

1. A method for transmitting a subscriber-specific message to a user associated with a mobile receiver over a TDMA communication channel having a plurality of frame sets, each frame set including one or more frames, each frame having a plurality of time slots, each time slot transmitting a plurality of data bits, the method comprising the steps of:

encoding data bits representing the subscriber-specific message to be transmitted to form one or more data codewords; and transmitting each data codeword a plurality of times over a message channel, the message channel having a plurality of message frames, each message frame including one or more time slots from each frame set of one or more frames of the TDMA communication channel.

2. The method of claim 1, wherein the TDMA communication channel includes voice slots for transmitting voice information at a first power level, control slots for transmitting control information at a second power level higher than the first power level, and wherein the message channel is established at a third power level higher than the second power level.

3. The method of claim 2, wherein the control slots include broadcast control channel slots, the broadcast control channel slots including one or more slots designated for use as a frequency correction channel, one or more slots designated for use as a synchronization channel, and one or more slots designated for use as a broadcast and paging channel, and wherein the message channel comprises a portion of the slots designated for the frequency correction channel and the synchronization channel.

4. The method of claim 3, wherein the broadcast control channel slots include the first slot in each frame of the TDMA communication channel.

5. The method of claim 1, wherein the TDMA communication channel is established over a satellite beam between a satellite and a mobile radiocommunication unit.

6. The method of claim 5, wherein each time slot of the message channel contains beam identification bits for identifying the satellite and satellite beam, and datacode bits for identifying one or more portions of the one or more data codewords.

7. The method of claim 6, further comprising the step of spreading the data codeword such that the datacode bits have one of a plurality of mutually orthogonal values representing one or more portions of a data codeword.

8. The method of claim 7, wherein the one or more data codewords are transmitted twice.

9. The method of claim 8, wherein the message frame includes fifty-one time slots, and the one or more time slots are the first, thirteenth, twenty-sixth, and fortieth time slots of each message frame.

10. The method of claim 1, wherein the message frame includes thirteen time slots, each frame set includes four frames, and each of the thirteen time slots corresponds to one frame set.

11. A system for transmitting a subscriber-specific message to a user associated with a mobile receiver over a TDMA communication channel having a plurality of frame sets, each frame set including one or more frames, each frame having a plurality of time slots, each time slot transmitting a plurality of data bits, comprising:

an encoder for encoding data bits representing the subscriber-specific message to be transmitted with error detection coding to form one or more data codewords; and a transmitter for transmitting each data codeword a plurality of times over a message channel, the message channel having a plurality of message frames, each message frame including one or more time slots from each frame set of one or more frames of the TDMA communication channel.

12. The system of claim 11, wherein the TDMA communication channel includes voice slots for transmitting voice information at a first power level, control slots for transmitting control information at a second power level higher than the first power level, and wherein the message channel is established at a third power level higher than the second power level.

13. The system of claim 12, wherein the TDMA control slots include a broadcast control channel slots, the broadcast control channel slots including one or more slots designated for use as a frequency correction channel, one or more slots designated for use as a synchronization channel, and one or more slots designated for use as a broadcast and paging channel, and wherein the message channel comprises a portion of the slots designated for the frequency correction channel and the synchronization channel.

14. The system of claim 13, wherein the broadcast control channel slots include the first slot in each frame of the TDMA communication channel.

15. The system of claim 11, wherein the TDMA communication channel is established over a satellite beam between a satellite and a mobile radiocommunication unit.

16. The system of claim 15, wherein each time slot of the message channel contains beam identification bits for identifying the satellite and satellite beam, and datacode bits for identifying one or more portions of the one or more data codewords.

17. The system of claim 16, wherein the transmitter spreads the data codeword such that the datacode bits have one of a plurality of mutually orthogonal values representing one or more portions of a data codeword.

18. The system of claim 17, wherein the one or more data codewords are transmitted twice.

19. The system of claim 18, wherein the message frame includes fifty-one time slots, and the selected ones of the one or more time slots are the first, thirteenth, twenty-sixth, and fortieth time slots of each message frame.

20. The system of claim 1, wherein the message frame includes thirteen time slots, each frame set includes four frames, and each of the thirteen time slots corresponds to one frame set.

* * * * *